(12) United States Patent
Fujikawa et al.

(10) Patent No.: US 8,530,072 B2
(45) Date of Patent: Sep. 10, 2013

(54) LITHIUM SECONDARY BATTERY HAVING POROUS HEAT RESISTANT LAYER BETWEEN ELECTRODES

(75) Inventors: Masato Fujikawa, Osaka (JP); Kaoru Inoue, Osaka (JP); Mikinari Shimada, Kyoto (JP)

(73) Assignee: Panasonic Corporation, Osaka (JP)

( * ) Notice: Subject to any disclaimer, the term of this patent is extended or adjusted under 35 U.S.C. 154(b) by 1062 days.

(21) Appl. No.: 11/705,510

(22) Filed: Feb. 13, 2007

(65) Prior Publication Data

US 2007/0190407 A1 Aug. 16, 2007

(30) Foreign Application Priority Data

Feb. 14, 2006 (JP) ................................. 2006-036166

(51) Int. Cl.
*H01M 2/14* (2006.01)
(52) U.S. Cl.
USPC ........... 429/130; 429/168; 429/169; 429/233; 429/246
(58) Field of Classification Search
None
See application file for complete search history.

(56) References Cited

U.S. PATENT DOCUMENTS

| | | | |
|---|---|---|---|
| 3,285,784 A | 11/1966 | Babusci et al. | |
| 3,442,716 A | 5/1969 | Ichiro et al. | |
| 4,927,719 A | 5/1990 | Ashihara et al. | |
| 4,929,519 A * | 5/1990 | Catotti | 429/94 |
| 5,925,482 A * | 7/1999 | Yamashita | 429/130 |
| 6,387,564 B1 * | 5/2002 | Yamashita et al. | 429/132 |
| 6,605,383 B1 | 8/2003 | Wu | |
| 2003/0215700 A1 * | 11/2003 | Hosoda et al. | 429/94 |
| 2005/0214637 A1 * | 9/2005 | Imachi et al. | 429/144 |
| 2006/0051663 A1 * | 3/2006 | Fujita et al. | 429/142 |

FOREIGN PATENT DOCUMENTS

| | | | |
|---|---|---|---|
| CN | 1728439 A | * | 2/2006 |
| DE | 3443454 | | 5/1986 |
| JP | 07-220759 | * | 8/1995 |
| JP | 7-220759 A | | 8/1995 |
| JP | 09-190814 | | 7/1997 |
| JP | 2000-100408 | * | 9/1998 |
| JP | 2000-048852 | | 2/2000 |

OTHER PUBLICATIONS

Linden et al, "Handbook of Batteries", 2002, p. 35.31.*
United States Office Action, issued in U.S. Appl. No. 12/730,687, dated Jul. 12, 2011.

* cited by examiner

*Primary Examiner* — Ula C Ruddock
*Assistant Examiner* — Tony Chuo
(74) *Attorney, Agent, or Firm* — McDermott Will & Emery LLP

(57) ABSTRACT

A lithium secondary battery having enhanced safety, which includes an electrode group, a non-aqueous electrolyte and a battery can for housing them. The electrode group includes: a positive electrode having a strip-shaped positive electrode current collector and a material mixture layer carried thereon; a negative electrode having a strip-shaped negative electrode current collector and a material mixture layer carried thereon; a separator; and a porous heat resistant layer. The positive and negative electrodes are spirally wound with the separator and the porous heat resistant layer interposed therebetween. An outermost surface of the electrode group includes an exposed portion of either of the positive and negative electrode current collectors. The exposed portion faces an inner surface of the battery can with the separator interposed therebetween, and has opposite polarity to that of the battery can.

6 Claims, 3 Drawing Sheets

LITHIUM SECONDARY BATTERY HAVING POROUS HEAT RESISTANT LAYER BETWEEN ELECTRODES

FIELD OF THE INVENTION

The present invention relates to a highly safe secondary battery. More particularly, this invention relates to a technique to enhance both safety in the event of an internal short-circuit and safety during nail penetration test.

BACKGROUND OF THE INVENTION

Lithium secondary batteries, which are light in weight and have a high energy density, are widely used mainly as a power source for portable devices. A typical lithium secondary battery comprises an electrode group, a non-aqueous electrolyte and a battery can for housing the electrode group and the non-aqueous electrolyte. The electrode group includes a positive electrode, a negative electrode and a separator. The positive electrode comprises a strip-shaped positive electrode current collector and a positive electrode material mixture layer carried on the positive electrode current collector. The negative electrode comprises a strip-shaped negative electrode current collector and a negative electrode material mixture layer carried on the negative electrode current collector. The positive electrode and the negative electrode are spirally wound with the separator interposed therebetween. The separator functions to insulate the positive electrode and the negative electrode from each other and to retain the non-aqueous electrolyte. The separator is usually a microporous film. The microporous film is produced by forming a polyolefin (e.g., polyethylene or polypropylene) resin into a sheet.

A typical microporous film tends to shrink upon heating because it comprises a polyolefin. Accordingly, if a lithium secondary battery is left in an extremely high temperature environment for a long period of time, the separator contained in the battery will deform. As a result, the positive electrode and the negative electrode physically come in contact with each other, causing an internal short-circuit. Once an internal short-circuit occurs, Joule heat is caused by the short-circuit current, which facilitates the deformation of the separator and allows the shorted area to enlarge. This can cause the battery to overheat.

In order to attain higher capacity lithium secondary batteries, thinner separators are being developed. However, the occurrence of internal short-circuit increases as the thickness of separators is decreased. Accordingly, prevention of an shorted area from enlarging in the event of an internal short-circuit is an important issue. Under the circumstances, Japanese Patent No. 3371301 (i.e., Japanese Laid-Open Patent Publication No. Hei 7-220759) proposes to form a porous insulating layer comprising an inorganic filler (solid fine particles) and a binder on an electrode surface. The porous insulating layer is filled with an inorganic filler such as alumina or silica. The filler particles are bonded by a relatively small amount of binder. Such porous insulating layer is difficult to shrink even at high temperatures. This prevents a shorted area from enlarging even in the event of an internal short-circuit, avoiding the overheating of the battery.

When a porous insulating layer is formed on an electrode surface as disclosed by Japanese Patent No. 3371301, because the porous insulating layer is rigid, the produced electrode will be less flexible. Moreover, a portion of the electrode group having a large curvature (e.g., an inner portion of an electrode group or a bend of an electrode group for a prismatic battery) will have a relatively low strength. If such electrode group is pierced with a nail through the low strength portion, the electrodes and separator will break easily and the shorted area will enlarge easily. Consequently, the overheating of battery may not be prevented.

BRIEF SUMMARY OF THE INVENTION

The present invention relates to a lithium secondary battery comprising an electrode group, a non-aqueous electrolyte and a battery can for housing the electrode group and the non-aqueous electrolyte, the electrode group comprising: a positive electrode comprising a strip-shaped positive electrode current collector and a positive electrode material mixture layer carried on the positive electrode current collector; a negative electrode comprising a strip-shaped negative electrode current collector and a negative electrode material mixture layer carried on the negative electrode current collector; a separator; and a porous heat resistant layer, the positive electrode and the negative electrode being spirally wound with the separator and the porous heat resistant layer interposed therebetween, wherein an outermost surface of the electrode group comprises an exposed portion of either of the positive electrode current collector and the negative electrode current collector, and the exposed portion faces an inner surface of the battery can with the separator interposed therebetween, and has opposite polarity to that of the battery can.

Since aluminum is light in weight and electrochemically stable in the positive electrode potential range, and has low electric resistance, the battery can preferably comprises aluminum and electrically connected to the positive electrode. In this case, the exposed portion is preferably an exposed portion of the negative electrode. The negative electrode current collector preferably comprises copper having low electric resistance.

The present invention further relates to a lithium secondary battery comprising an electrode group, a non-aqueous electrolyte and a battery case for housing the electrode group and the non-aqueous electrolyte, the electrode group comprising: a positive electrode comprising a strip-shaped positive electrode current collector and a positive electrode material mixture layer carried on the positive electrode current collector; a negative electrode comprising a strip-shaped negative electrode current collector and a negative electrode material mixture layer carried on the negative electrode current collector; a separator; and a porous heat resistant layer, the positive electrode and the negative electrode being spirally wound with the separator and the porous heat resistant layer interposed therebetween, wherein the battery case comprises: a first battery can for housing the electrode group; and a second battery can for housing the first battery can, an insulating layer is disposed between the first battery can and the second battery can, and one of the positive electrode and the negative electrode is electrically connected to the first battery can, and the other electrode is electrically connected to the second battery can.

According to the present invention, even when a nail is inserted through a low strength portion of the electrode group, it is possible to prevent a short-circuit current from concentrating to electrodes and shunt the current to an element (e.g., battery can) other than electrodes. Therefore, a lithium secondary battery having both enhanced safety in the event of an internal short-circuit and enhanced safety during nail penetration test can be obtained.

While the novel features of the invention are set forth particularly in the appended claims, the invention, both as to organization and content, will be better understood and

DETAILED DESCRIPTION OF THE INVENTION

Figure 1:
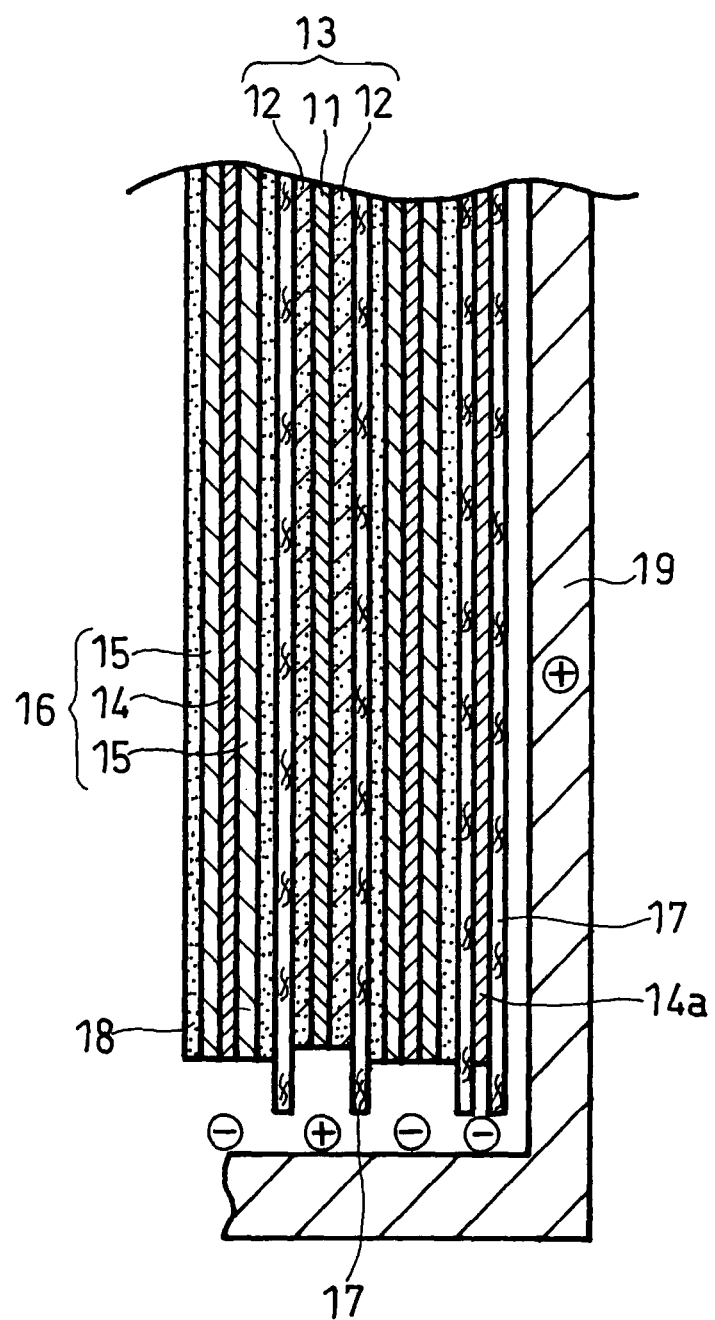
FIG. 1 is a schematic partial cross-sectional view of a lithium secondary battery according to a first embodiment of the present invention.

FIG. 1 schematically shows a partial cross-section of a lithium secondary battery according to a first embodiment of the present invention. A positive electrode 13 includes a strip-shaped positive electrode current collector 11 and positive electrode material mixture layers 12 carried on the positive electrode current collector 11. A negative electrode 16 includes a strip-shaped negative electrode current collector 14 and negative electrode material mixture layers 15 carried on the negative electrode current collector 14. The positive electrode 13 and the negative electrode 16 are spirally wound with a strip-shaped separator 17 interposed therebetween, forming an electrode group. A porous heat resistant layer 18 is formed on the surface of each negative electrode material mixture layer 15. The porous heat resistant layers 18 serve to prevent a shorted area from enlarging in the event of an internal short-circuit.

The outermost surface of the electrode group comprises an exposed portion 14a of the negative electrode current collector which serves to shunt short-circuit current. The exposed portion 14a of the negative electrode current collector faces the inner surface of a battery can 19 with the separator 17 interposed therebetween. The battery can 19 also serves to shunt short-circuit current. The battery can 19 is electrically connected to the positive electrode 13, and has opposite polarity to that of the exposed portion 14a of the negative electrode current collector. When the outermost surface of the electrode group comprises an exposed portion of the positive electrode current collector, the battery can should be electrically connected to the negative electrode.

At one end of a current collector that forms the outermost surface of the electrode group, the current collector may be exposed at both surfaces (i.e., no material mixture layer is carried on both an inner exposed portion and an outer exposed portion). Alternatively, at the end of the current collector, the current collector may be exposed at only one surface (e.g., a material mixture layer is carried on an inner exposed portion and the current collector is exposed at only an outer exposed portion). Preferably, a current collector is exposed over the entire outermost surface of the electrode group. The exposed portion(s) may have a length in a winding direction longer than that of the outermost surface of the electrode group.

If the battery of FIG. 1 is pierced with a nail, before a short circuit occurs between the facing positive and negative electrode material mixture layers, a shorted area having low resistance is formed between the battery can and the exposed portion of the negative electrode current collector that forms the outermost surface. As a result, the short-circuit current is shunted to the shorted area having low resistance, preventing the short-circuit current from flowing between the facing positive and negative electrode material mixture layers. This prevents the heat generation caused by the short-circuit current and improves safety during nail penetration test.

Battery cans are usually made of iron or aluminum. Because aluminum cans are less rigid than iron cans, if a nail is inserted into a battery can made of aluminum, the aluminum battery can deforms more, and significant damage may occur to the electrode group contained in the battery can. Accordingly, the effect of the present invention is pronounced particularly when the battery can comprises aluminum. When using an aluminum can in the present invention, because the battery can needs to be electrically connected to the positive electrode, the outermost surface of the electrode group should comprise an exposed portion of the negative electrode current collector.

Figure 2:
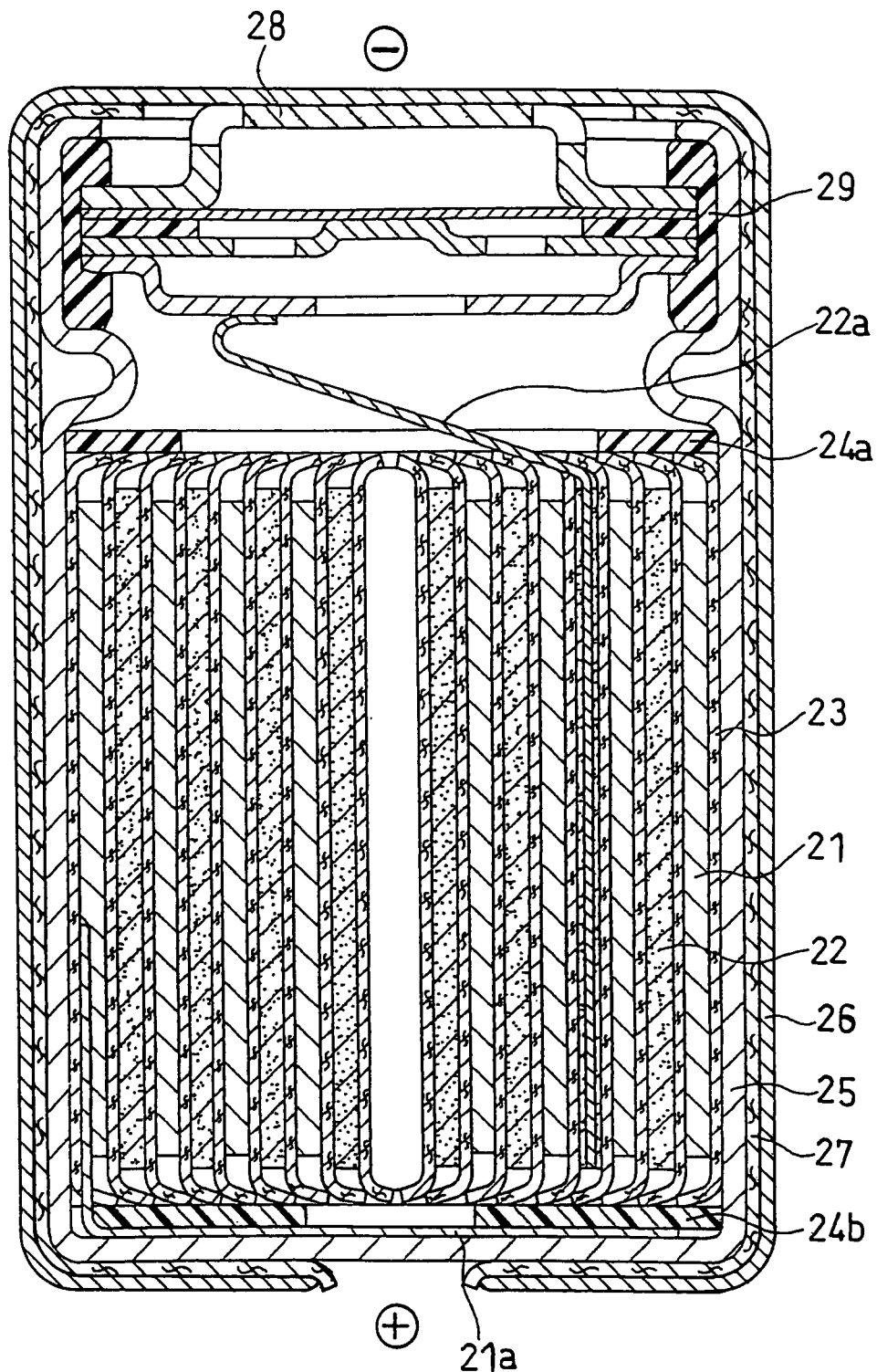
FIG. 2 is a schematic cross-sectional view of a lithium secondary battery according to a second embodiment of the present invention.

FIG. 2 schematically shows a partial cross-section of a lithium secondary battery according to a second embodiment of the present invention. This battery includes an electrode group in which a positive electrode 21 and a negative electrode 22 are spirally wound with a separator 23 interposed therebetween. On the surface of each negative electrode material mixture layer is formed a porous heat resistant layer (not shown) for preventing a shorted area from enlarging in the event of an internal short-circuit. A battery case includes a first battery can 25 for housing the electrode group having insulating plates 24a and 24b on the top and bottom thereof, respectively, and a second battery can 26 for housing the first battery can 25. Between the first battery can 25 and the second battery can 26 is formed an insulating layer 27. In this case, the first battery can 25 and the second battery can 26 serve to shunt short-circuit current.

To the positive electrode 21 is connected one end of a positive electrode lead 21a. The other end of the positive electrode lead 21a is connected to the inner bottom of the first battery can 25. Accordingly, the positive electrode 21 is electrically connected to the first battery can 25. To the negative electrode 22 is connected one end of a negative electrode lead 22a. The other end of the negative electrode lead 22a is connected to the underside of a sealing plate 28. The sealing plate 28 is equipped with a gasket 29 therearound. The opening of the first battery can 25 is sealed with the sealing plate 28. The upper surface of the sealing plate 28 is connected to the second battery can 26. In other words, the negative electrode 22 is electrically connected to the second battery can 26 with the sealing plate 28 interposed therebetween. Alternatively, the polarities of the first and second battery cans may be reversed by connecting the positive electrode lead to the underside of the sealing plate and connecting the negative electrode lead to the inner bottom of the first battery can.

The battery case of the battery of FIG. 2 has a double structure comprising a first battery can and a second battery can. According to this structure, even if a nail is inserted into the battery, before a short circuit occurs between the facing positive and negative electrode material mixture layers, a shorted area having low resistance is formed between the first battery can and the second battery can. As a result, the short-circuit current is shunted to the shorted area having low resistance, preventing the short-circuit current from flowing between the facing positive and negative electrode material mixture layers. This prevents the heat generation caused by the short-circuit current and improves safety during nail penetration test.

Because the first battery can and the second battery can need to form a shorted area having low resistance if a nail is inserted thereinto, the first battery can and the second battery can should be made of materials having lower electric resistance than positive and negative electrode active materials. Preferred examples include an aluminum can, an iron can and a nickel can. The first battery can comes in contact with the non-aqueous electrolyte. When the first battery can is an aluminum can, the aluminum can needs to be electrically connected to the positive electrode. When the first battery can is an iron can or nickel can, it needs to be electrically connected to the negative electrode. The second battery can may be made of any material as long as it has lower electric resistance because the second battery can does not come in contact with the non-aqueous electrolyte. Accordingly, when the positive electrode and the first battery can are electrically connected, it is preferred that the first battery can is an aluminum can and the second battery can is an aluminum can, iron can or nickel can. Conversely, when the negative electrode and the first battery can are electrically connected, it is preferred that the first battery can be an iron can or nickel can and the second battery can be an aluminum can, iron can or nickel can.

Although the thicknesses of the first and second battery cans are not specifically limited, the side portion (the portion that faces the outermost surface of the electrode group) of the first battery can preferably has a thickness of 50 to 1000 μm, for example. The side portion of the second battery can preferably has a thickness of 50 to 300 μm, for example.

The insulating layer disposed between the first battery can and the second battery can may be made of any insulating material. Preferred examples include a microporous resin film which is used for separators of batteries, a resin sheet, a resin tape, paper and a non-woven fabric made of resin fiber. When the insulating layer is made of a non-woven fabric, the insulating layer preferably has a thickness of 100 to 1000 μm. When the insulating layer is made of a microporous resin film, resin sheet or resin tape, the insulating layer preferably has a thickness of 20 to 300 μm.

The porous heat resistant layer may be formed anywhere between the positive and negative electrodes. The number of porous heat resistant layers is not limited, either. For example, a porous heat resistant layer may be formed on the positive electrode or the negative electrode. Alternatively, a porous heat resistant layer may be combined with the separator. Still alternatively, a porous heat resistant layer is formed on a flat substrate, and the formed porous heat resistant layer is then removed from the substrate to form a separate film. The separate film may be used. Preferably, porous heat resistant layers are formed on both surfaces of the negative electrode, or a porous heat resistant layer is formed on one surface of the separator. Alternatively, porous heat resistant layers are formed on both surfaces of the positive electrode, or a porous heat resistant layer is formed on one surface of the positive electrode and another porous heat resistant layer is formed on one surface of the negative electrode. In any case, the porous heat resistant layer(s) is preferably formed between the positive and negative electrode material mixture layers that face to each other.

The porous heat resistant layer is preferably made of a resin having high heat resistance (hereinafter referred to as highly heat resistant resin) or a composite of a heat resistant filler and a resin binder. When the porous heat resistant layer is made of a highly heat resistant resin, it may further contain, for example, less than 80 wt % (preferably 25 to 75 wt %) of an insulating filler. The addition of an insulating filler provides a porous heat resistant layer having an excellent balance of flexibility and durability. When the porous heat resistant layer is made of a composite of a heat resistant filler and a resin binder, the heat resistant filler is the main component. The amount of the heat resistant filler is, for example, 80 wt % or more (preferably 90 to 99 wt %) of the porous heat resistant layer.

The highly heat resistant resin needs to be more heat resistant than the separator. Preferably, the highly heat resistant resin has a heat deflection temperature of 260° C. or higher, for example. The heat deflection temperature used herein means a deflection temperature under load determined with a load of 1.82 MPa according to ASTM-D648 defined by American Society for Testing and Materials.

Examples of the highly heat resistant resin include aramid (aromatic polyamide), polyamide imide, polyimide and cellulose. They may be used singly or in any combination of two or more.

Examples of the heat resistant filler and insulating filler include inorganic oxide, ceramics, glass, fibrous highly heat resistant resin and particulate highly heat resistant resin. Examples of the inorganic oxide include alumina, silica, titania, zirconia, magnesia and yttria. They are preferred because they are chemically stable in a battery. They may be used singly or in any combination of two or more.

The resin binder can be polyvinylidene fluoride (PVDF), an acrylic rubber particle such as BM-500B (trade name) available from Zeon Corporation, Japan, or polytetrafluoroethylene (PTFE). PTFE and the rubber particle are preferably used together with a thickener. The thickener can be carboxymethyl cellulose (CMC), polyethylene oxide (PEO) or modified polyacrylonitrile rubber (e.g., BM-720H (trade name) available from Zeon Corporation, Japan). The resin binder preferably has, but is not limited to, a heat deflection temperature of 260° C. or higher.

The porous heat resistant layer comprising a highly heat resistant resin can be obtained by any of the following methods, for example.

(i) A resin solution is first prepared by dissolving a highly heat resistant resin in a solvent. The solvent for dissolving the highly heat resistant resin is preferably, but not limited to, a polar solvent such as N-methyl-2-pyrrolidone (NMP). In the resin solution, an insulating filler may be dispersed in an amount of 500 parts by weight or less (preferably 33 to 300 parts by weight) per 100 parts by weight of the highly heat resistant resin. The resin solution may further contain a pore-forming agent such as calcium chloride. The thus-prepared resin solution is applied onto a surface of at least one of the positive electrode, the negative electrode and the separator, which is then dried or washed to remove the solvent and the pore-forming agent. In this manner, a porous heat resistant layer combined with the positive electrode, negative electrode or separator can be obtained.

(ii) The same resin solution as prepared in (i) above is applied onto a flat substrate (e.g., made of glass or stainless steel), which is then dried or washed to remove the solvent and the pore-forming agent. The resulting porous sheet comprising a highly heat resistant resin is peeled off from the substrate to obtain a separate film. The separate film is placed between electrodes or between an electrode and a separator.

The heat resistant layer comprising a composite of a heat resistant filler and a resin binder can be obtained by any of the following methods, for example.

(iii) A paste or slurry is first prepared by mixing a heat resistant filler and a resin binder with a liquid component. Preferred amount of the resin binder is 0.5 to 10 parts by weight per 100 parts by weight of the heat resistant filler. The liquid component can be, but is not limited to, NMP. The heat resistant filler, the resin binder and the liquid component can be mixed using, for example, a double arm kneader. The obtained paste or slurry is applied onto a surface of at least one of the positive electrode, the negative electrode and the separator, which is then dried to remove the liquid component. The paste or slurry can be applied using, for example, a doctor blade, die coater or gravure roll.

(iv) The same paste or slurry as prepared in (iii) above is applied onto a flat substrate, which is then dried to remove the liquid component. The resulting porous sheet made of a composite of a heat resistant filler and a resin binder is peeled off from the substrate to obtain a separate film. The separate film is placed between the electrodes or between the electrode and the separator.

The porous heat resistant layer preferably has a porosity (a ratio of the volume of the pores to the apparent volume) of 20 to 70% so as to allow sufficient migration of ions while retaining sufficient strength. The porosity can be calculated from the true specific gravity, weight and thickness of a specified area of the porous heat resistant layer.

The porous heat resistant layer preferably has a thickness of 1 to 20 μm, and more preferably 2 to 15 μm. When the porous heat resistant layer has a thickness of less than 1 μm, the effect of enhancing safety in the event of an internal short-circuit is small. Conversely, when the porous heat resistant layer has a thickness exceeding 20 μm, battery resistance can be high.

The positive electrode current collector is preferably an aluminum foil or aluminum alloy foil having a thickness of 10 to 30 μm. The negative electrode current collector is preferably a copper foil having a thickness of 5 to 50 μm.

The positive electrode material mixture layer comprises a positive electrode active material. The positive electrode active material can be any material conventionally used as a positive electrode active material for lithium secondary batteries. Specifically, a lithium-containing transition metal oxide such as lithium cobalt oxide, lithium nickel oxide or lithium manganese oxide can be used. Part of the transition metal contained in the lithium-containing transition metal oxide may be replaced with other element. Alternatively, the surface of the oxide particle may be covered with other element. The materials for positive electrode active material may be used singly or in any combination of two or more.

The positive electrode material mixture layer is preferably prepared by allowing a current collector to carry a material mixture comprising a positive electrode active material and a small amount of a binder (e.g., PTFE, PVDF, BM-500B, etc.). The positive electrode material mixture may further contain a small amount of a conductive material (e.g., acetylene black, ketjen black, graphite, etc.).

The negative electrode material mixture layer comprises a negative electrode active material. The negative electrode active material can be any material conventionally used as a negative electrode active material for lithium secondary batteries. Specific Examples include a carbon material (e.g., natural graphite, artificial graphite, hard carbon), an element capable of alloying with lithium (e.g., Al, Si, Zn, Ge, Cd, Sn, Ti, Pb), a silicon compound (e.g., $SiO_x$ (0<x<2)), a tin compound (e.g., SnO), lithium metal and an alloy (e.g., Ni—Si alloy, Ti—Si alloy). The lithium metal can be simple substance of lithium or a lithium alloy such as Li—Al alloy. The materials for negative electrode active material may be used singly or in any combination of two or more.

The negative electrode active material may be deposited directly onto the current collector. Preferably, the negative electrode active material layer is prepared by allowing a current collector to carry a material mixture comprising a negative electrode active material and a small amount of a binder (e.g., PVDF, styrene butadiene rubber, polyacrylic acid).

Similar to the positive electrode material mixture, the negative electrode material mixture may further contain a conductive material.

The separator can comprise any material conventionally used as a separator for lithium secondary batteries. Preferred is a microporous film made of a polyolefin such as polyethylene or polypropylene. Particularly preferred is a monolayer film comprising polyethylene or a multilayer film comprising a polyethylene layer and a polypropylene layer.

The non-aqueous electrolyte is preferably prepared by dissolving a solute such as a lithium salt in a non-aqueous solvent.

Examples of the lithium salt include lithium hexafluorophosphate ($LiPF_6$), lithium perchlorate ($LiClO_4$), lithium tetrafluoroborate ($LiBF_4$), $LiAlCl_4$, $LiSbF_6$, LiSCN, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylate, LiCl, LiBr, LiI, lithium tetrachloroborate, lithium tetraphenylborate and lithium imide salt. They may be used singly or in any combination of two or more. Preferred amount of the lithium salt dissolved in a non-aqueous solvent is not specifically limited. Preferred lithium salt concentration is 0.2 to 2 mol/L, and more preferably 0.5 to 1.5 mol/L.

Examples of the non-aqueous solvent include: cyclic carbonates such as ethylene carbonate (EC), propylene carbonate (PC) and butylene carbonate (BC); chain carbonates such as dimethyl carbonate (DMC), diethyl carbonate (DEC), ethyl methyl carbonate (EMC) and dipropyl carbonate (DPC); aliphatic carboxylic acid esters such as methyl formate, methyl acetate, methyl propionate and ethyl propionate; lactones such as γ-butyrolactone and γ-valerolactone; chain ethers such as 1,2-dimethoxyethane (DME), 1,2-diethoxyethane (DEE) and ethoxymethoxyethane (EME); cyclic ethers such as tetrahydrofuran and 2-methyltetrahydrofuran; dimethyl sulfoxide; 1,3-dioxolane; formamide; acetamide; dimethylformamide; dioxolane; acetonitrile; propionitrile; nitromethane; ethyl monoglyme; phosphoric acid triester; trimethoxymethane; dioxolane derivative; sulfolane; methylsulfolane; 1,3-dimethyl-2-imidazolidinone; 3-methyl-2-oxazolidinone; propylene carbonate derivative; tetrahydrofuran derivative; ethyl ether; 1,3-propanesultone; anisole; dimethyl sulfoxide; and N-methyl-2-pyrrolidone. They may be used singly, but combined use of two or more is preferred. Particularly preferred is a mixed solvent of a cyclic carbonate and a chain carbonate or a mixed solvent of a cyclic carbonate, a chain carbonate and an aliphatic carboxylic acid ester.

The non-aqueous electrolyte may further contain an additive so as to improve charge/discharge characteristics of the battery. The additive is preferably vinylene carbonate (VC), vinyl ethylene carbonate (VEC), cyclohexylbenzene (CHB), fluorobenzene, etc. These additives serve to form a coating film on the positive electrode and/or the negative electrode, which improves the stability during overcharge.

The present invention is described below in detail with reference to examples, but it should be understood that the present invention is not limited to the examples given below.

EXAMPLE 1

(i) Production of Positive Electrode

A positive electrode material mixture paste was prepared by mixing 3 kg of lithium cobalt oxide with 1 kg of PVDF#1320 (an N-methyl-2-pyrrolidone (NMP) solution containing 12 wt % PVDF) available from KUREHA CORPORATION, 90 g of acetylene black and an appropriate amount of NMP with the use of a double arm kneader. This paste was applied onto both surfaces of a 15 μm thick aluminum foil serving as a positive electrode current collector. The coating films of the paste were dried and rolled to form positive electrode material mixture layers. The positive electrode current collector was then cut into a strip having a width of 43.5 mm to obtain a positive electrode. The positive electrode had a thickness of 150 μm. At one end of the positive electrode current collector, exposed portions carrying no positive electrode material mixture layer were formed on both surfaces. The exposed portions each had a length of 25 mm.

When cutting the positive electrode current collector, two blades which were placed parallel to each other with a spacing of 300 μm therebetween were used. Consequently, burrs having a height of 80 to 150 μm were created in the cutting faces. The reason for producing such positive electrode having burrs, which is likely to cause an internal short-circuit, is to evaluate the battery safety in the event of an internal short-circuit.

(ii) Production of Negative Electrode

A negative electrode material mixture paste was prepared by mixing 3 kg of artificial graphite, 75 g of BM-400B (an aqueous dispersion containing 40 wt % styrene-butadiene copolymer rubber particles) available from Zeon Corporation, Japan, 30 g of carboxymethyl cellulose (CMC) and an appropriate amount of water with the use of a double arm kneader. This paste was applied onto both surfaces of a 10 μm thick copper foil serving as a negative electrode current collector. The coating films of the paste were dried and rolled to form negative electrode material mixture layers. The negative electrode current collector was then cut into a strip having a width of 44.5 mm to obtain a negative electrode. The negative electrode had a thickness of 150 μm. At one end of the negative electrode current collector, exposed portions carrying no negative electrode material mixture layer were formed on both surfaces. The exposed portions had different lengths: an exposed portion on the surface that would serve as an outer surface of an electrode group (hereinafter referred to as outer exposed portion) had a length of 90 mm (the same length as that of the outermost surface of an electrode group); and another exposed portion on the surface that would serve as an inner surface (hereinafter referred to as inner exposed portion) had a length of 25 mm.

(iii) Formation of Porous Heat Resistant Layer

A precursor paste for porous heat resistant layer was prepared by mixing 970 g of alumina having a median size of 0.3 μm with 375 g of BM-720H (trade name, an NMP solution containing 8 wt % modified polyacrylonitrile rubber) available from Zeon Corporation, Japan and an appropriate amount of NMP with the use of a double arm kneader. This paste was applied onto the surface of each negative electrode material mixture layer, which was then dried at 120° C. in a vacuum with a reduced pressure for 10 hours. Thereby, porous heat resistant layers each having a thickness of 5 μm were formed.

(iv) Preparation of Non-Aqueous Electrolyte

A non-aqueous electrolyte was prepared by dissolving $LiPF_6$ in a solvent mixture of ethylene carbonate (EC), dimethyl carbonate (DMC) and ethyl methyl carbonate (EMC) at a volume ratio of 1:1:1 at a $LiPF_6$ concentration of 1 mol/L. In the non-aqueous electrolyte was further dissolved 3 wt % of vinylene carbonate (VC).

(v) Production of Battery

An end of a positive electrode lead was connected to the inner exposed portion of the positive electrode current collector. An end of a negative electrode lead was connected to the inner exposed portion of the negative electrode current collector. The positive and negative electrodes were spirally wound with a microporous polyethylene film having a thickness of 15 μm and a width of 47 mm (available from Celgard Inc.) serving as a separator interposed therebetween so as to form an electrode group whose cross section was substantially an ellipse. When spirally winding the positive and negative electrodes, the exposed portions of the positive electrode current collector were placed such that they would be at the center of the formed electrode group. The exposed portions of the negative electrode current collector were placed such that they would be at the outermost turn. In other words, the negative electrode current collector was exposed over the entire outermost side surface of the obtained electrode group, which would serve to shunt short-circuit current. Thereafter, the entire outermost surface of the electrode group was covered with the separator.

Figure 3:
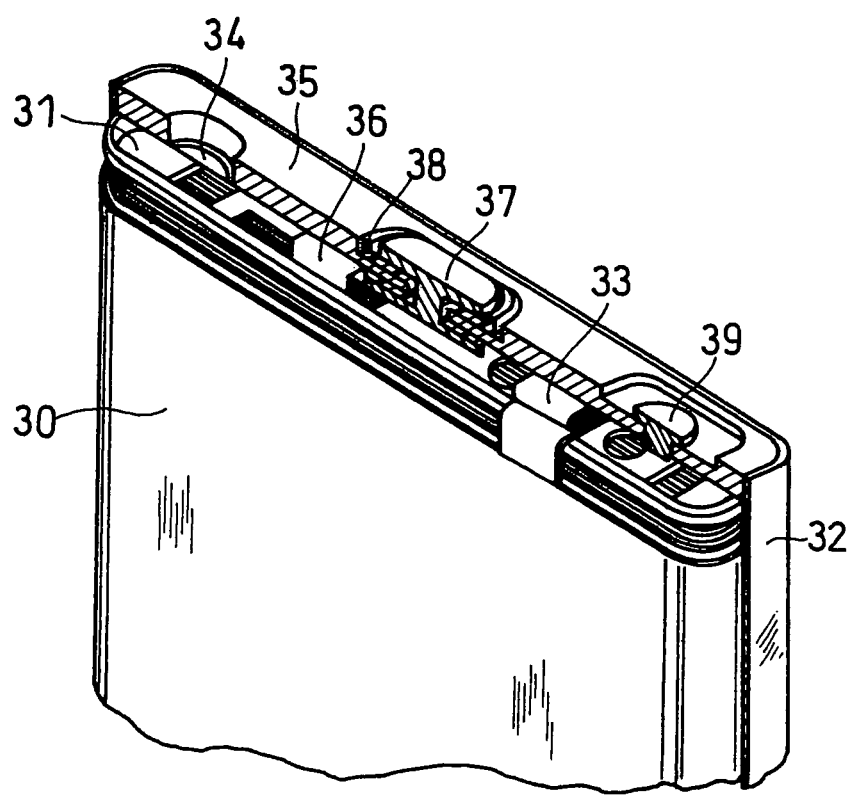
FIG. 3 is a partially cut-away perspective view of a prismatic battery according to EXAMPLE of the present invention.

Using the thus-obtained electrode group, a prismatic battery as shown in FIG. 3 was produced as follows.

A polyethylene insulating plate 31 was placed on the top of the electrode group, which was then housed into a prismatic aluminum can 32 having an opening and bottom (first battery can). The other end of the positive electrode lead 33 was welded to the underside of a sealing plate 35 equipped with a safety valve 34. The other end of the negative electrode lead 36 was welded to the bottom of an external terminal 37 made of nickel which was at the center of the sealing plate 35. An insulating member 38 was placed between the external terminal 37 and the sealing plate 35. The opening edge of the aluminum can 32 and the rim of the sealing plate 35 were connected by laser welding. Then, the non-aqueous electrolyte in an amount of 2.5 g was injected thereinto from the inlet of the sealing plate 35. Finally, an aluminum plug 39 was inserted into the inlet, which was then sealed by laser welding. Thereby, a prismatic battery having a width of 34 mm, a height of 50 mm and a thickness of 5.2 mm was produced. In this battery, the exposed portions of the negative electrode current collector served as a current shunt for negative electrode, and the aluminum can served as a current shunt for positive electrode.

EXAMPLE 2

An electrode group was produced in the same manner as in EXAMPLE 1 except that the inner and outer exposed portions of the negative electrode current collector each had a length of 25 mm (lead welding portion). In the obtained electrode group, the proportion of the exposed portion of the current collector in the entire outermost surface of the electrode group was small. A prismatic battery was produced in the same manner as in EXAMPLE 1 except that this electrode group was used.

Subsequently, the entire battery was covered with a hollow cylindrical separator except for the center of the bottom of the aluminum can (first battery can) and the external terminal. Accordingly, the center of the bottom of the aluminum can was exposed. The separator-covered battery was then housed into an iron can (second battery can) having a shape substantially similar to that of the aluminum can such that the external terminal of the battery was at the bottom of the iron can. The external terminal was connected to the inner bottom of the iron can by welding. The opening edge of the iron can was crimped onto the outer bottom of the aluminum can with the hollow cylindrical separator interposed therebetween. Thereby, a battery was produced. In this battery, the iron can served as a current shunt for negative electrode, and the aluminum can served as a current shunt for positive electrode.

EXAMPLE 3

A positive electrode was produced in the same manner as in EXAMPLE 1 except that the inner and outer exposed portions of the positive electrode current collector had a length of 25 mm and 90 mm, respectively.

A negative electrode was produced in the same manner as in EXAMPLE 1 except that the inner and outer exposed portions of the negative electrode current collector each had a length 25 mm.

A prismatic battery was produced in the same manner as in EXAMPLE 1 except for the following.

An end of a positive electrode lead and an end of a negative electrode lead were connected to the inner exposed portions of the positive and negative electrode current collectors, respectively. The positive and negative electrodes were spirally wound with a separator interposed therebetween to form an electrode group whose cross section was substantially an ellipse. When spirally winding the positive and negative electrodes, the exposed portions of the negative electrode current collector were placed such that they would be at the center of the formed electrode group. The exposed portions of the positive electrode current collector were placed such that they would be at the outermost turn. The obtained electrode group was housed into an iron can. The other end of the negative electrode lead was welded to the underside of a sealing plate having a safety valve. The other end of the positive electrode lead- was connected to the bottom of the external terminal.

In this battery, the iron can served as a current shunt for negative electrode, and the exposed portions of the positive electrode current collector served as a current shunt for positive electrode.

EXAMPLE 4

An electrode group was produced in the same manner as in EXAMPLE 3 except that the inner and outer exposed portions of the positive electrode current collector each had a length of 25 mm (lead welding portion). In the obtained electrode group, the proportion of the exposed portion of the current collector in the entire outermost surface of the electrode group was small. A prismatic battery was produced in the same manner as in EXAMPLE 3 except,that this electrode group was used.

Subsequently, the entire battery was covered with a hollow cylindrical separator except for the center of the bottom of the iron can (first battery can) and the external terminal. Accordingly, the center of the bottom of the iron can was exposed. The separator-covered battery was then housed into an aluminum can (second battery can) having a shape substantially similar to that of the iron can such that the external terminal of the battery was at the bottom of the aluminum can. The external terminal was connected to the inner bottom of the aluminum can by welding. The opening edge of the aluminum can was crimped onto the outer bottom of the iron can with the hollow cylindrical separator interposed therebetween. Thereby, a battery was produced. In this battery, the iron can served as a current shunt for negative electrode, and the aluminum can served as a current shunt for positive electrode.

EXAMPLE 5

A cylindrical battery was produced as follows.

A positive electrode was produced in the same manner as in EXAMPLE 1 except that the thickness and the width were changed to 180 μm and 56 mm, respectively, and the inner and outer exposed portions of the positive electrode current collector each had a length of 40 mm.

A negative electrode was produced in the same manner as in EXAMPLE 1 except that the thickness and the width were changed to 180 μm and 57.5 mm, respectively, and the inner and outer exposed portions of the negative electrode current collector had a length of 25 mm and 80 mm, respectively.

An end of a positive electrode lead and an end of a negative electrode lead were connected to the inner exposed portions of the positive and negative electrode current collectors, respectively. The positive and negative electrodes were spirally wound with a separator having a width of 60.7 mm interposed therebetween to form an electrode group whose cross section was circular. When spirally winding the positive and negative electrodes, the exposed portions of the positive electrode current collector were placed such that they would be at the center of the formed electrode group. The exposed portions of the negative electrode current collector were placed such that they would be at the outermost turn. The negative electrode current collector was exposed over the entire outermost side surface of the obtained electrode group. Thereafter, the entire outermost surface of the electrode group was covered with the separator.

Insulating plates were placed on the top and bottom of the electrode group, which was then housed into a cylindrical aluminum can having an opening and bottom. The other end of the negative electrode lead was welded to the underside of a sealing plate equipped with a safety valve. The other end of the positive electrode lead was welded to the inner bottom of the aluminum can. Subsequently, 5.5 g of the non-aqueous electrolyte was injected into the aluminum can. The opening of the aluminum can was then sealed with a sealing plate equipped with a gasket therearound. The opening edge of the aluminum can was crimped onto the gasket. Thereby, a cylindrical battery having a diameter of 18 mm and a height of 65 mm was produced. In this battery, the exposed portions of the negative electrode current collector served as a current shunt for negative electrode, and the aluminum can served as a current shunt for positive electrode.

EXAMPLE 6

An electrode group was produced in the same manner as in EXAMPLE 5 except that the inner and outer exposed portions of the negative electrode current collector each had a length of 25 mm (lead welding portion). In the obtained electrode group, the proportion of the exposed portion of the current collector in the entire outermost surface of the electrode group was small. A cylindrical battery was produced in the same manner as in EXAMPLE 5 except that this electrode group was used.

The entire battery was then covered with a hollow cylindrical separator except for the center of the bottom of the aluminum can (first battery can) and the sealing plate. The separator-covered battery was then housed into an iron can (second battery can) having a shape substantially similar to that of the aluminum can such that the sealing plate of the battery was at the inner bottom of the iron can. The sealing plate and the inner bottom of the iron can were connected by welding. The opening edge of the iron can was crimped onto the outer bottom of the aluminum can with the hollow cylindrical separator interposed therebetween. Thereby, a battery was produced. In this battery, the iron can served as a current shunt for negative electrode, and the aluminum can served as a current shunt for positive electrode.

EXAMPLE 7

A positive electrode was produced in the same manner as in EXAMPLE 5 except that the inner and outer exposed portions of the positive electrode current collector had a length of 25 mm and 80 mm, respectively.

A negative electrode was produced in the same manner as in EXAMPLE 5 except that the inner and outer exposed portions of the negative electrode current collector each had a length of 40 mm. A cylindrical battery was produced in the same manner as in EXAMPLE 5 except for the following.

An end of a positive electrode lead and an end of a negative electrode lead were connected to the inner exposed portions of the positive and negative electrode current collectors, respectively. The thus-obtained positive and negative electrodes were spirally wound with a separator interposed therebetween to form an electrode group whose cross section was circular. When spirally winding the positive and negative electrodes, the exposed portions of the negative electrode current collector were placed such that they would be at the center of the formed electrode group. The exposed portions of the positive electrode current collector were placed such that they would be at the outermost turn. The obtained electrode group was housed into an iron can. The other end of the positive electrode lead was welded to the underside of a sealing plate having a safety valve. The other end of the negative electrode lead was connected to the inner bottom of the iron can. In this battery, the iron can served as a current shunt for negative electrode, and the exposed portion of the positive electrode current collector served as a current shunt for positive electrode.

EXAMPLE 8

An electrode group was produced in the same manner as in EXAMPLE 7 except that the inner and outer exposed portions of the positive electrode current collector each had a length of 25 mm (lead welding portion). In the obtained electrode group, the proportion of the exposed portion of the current collector in the entire outermost side surface of the electrode group was small. A cylindrical battery was produced in the same manner as in EXAMPLE 7 except that this electrode group was used.

The entire battery was then covered with a hollow cylindrical separator except for the center of the bottom of the iron can (first battery can) and the sealing plate. The separator-covered battery was then housed into an aluminum can (second battery can) having a shape substantially similar to that of the iron can such that the sealing plate of the battery was at the bottom of the aluminum can. The sealing plate and the inner bottom of the aluminum can were connected by welding. The opening edge of the aluminum can was crimped onto the outer bottom of the iron can with the hollow cylindrical separator interposed therebetween. Thereby, a battery was produced. In this battery, the iron can served as a current shunt for negative electrode, and the aluminum can served as a current shunt for positive electrode.

EXAMPLE 9

A prismatic battery was produced in the same manner as in EXAMPLE 1 except that a porous heat resistant layers each having a thickness of 5 μm were formed, instead of on the negative electrode material mixture layers, on the positive electrode material mixture layers by applying the precursor paste for porous heat resistant layer onto the positive electrode material mixture layers, followed by drying at 120° C. in a vacuum with a reduced pressure for 10 hours.

EXAMPLE 10

A prismatic battery was produced in the same manner as in EXAMPLE 2 except that a porous heat resistant layers each having a thickness of 5 μm were formed, instead of on the negative electrode material mixture layers, on the positive electrode material mixture layers by applying the precursor paste for porous heat resistant layer onto the positive electrode material mixture layers, followed by drying at 120° C. in a vacuum with a reduced pressure for 10 hours.

EXAMPLE 11

A prismatic battery was produced in the same manner as in EXAMPLE 1 except that a porous heat resistant layer having a thickness of 5 μm was formed, instead of on the negative electrode material mixture layers, on one surface of the separator by applying the precursor paste for porous heat resistant layer onto one surface of the separator, followed by drying at 80° C. in a vacuum with a reduced pressure for 10 hours, and that when producing an electrode group, the separator was placed such that the porous heat resistant layer faced the negative electrode.

EXAMPLE 12

A prismatic battery was produced in the same manner as in EXAMPLE 2 except that a porous heat resistant layer having a thickness of 5 μm was formed, instead of on the negative electrode material mixture layers, on one surface of the separator by applying the precursor paste for porous heat resistant layer onto one surface of the separator, followed by drying at 80° C. in a vacuum with a reduced pressure for 10 hours, and that when producing an electrode group, the separator was placed such that the porous heat resistant layer faced the negative electrode.

EXAMPLES 13 TO 15

Prismatic batteries were produced in the same manner as in EXAMPLE 1 except that, instead of alumina serving as the heat resistant filler, magnesia, zirconia or silica was used.

EXAMPLE 16

A prismatic battery was produced in the same manner as in EXAMPLE 1 except that a porous heat resistant layer comprising aramid was formed on the negative electrode material mixture layers.

Dried anhydrous calcium chloride in an amount of 65 g was dissolved completely in 1 kg of N-methyl-2-pyrrolidone (NMP) in a reaction vessel heated to 80° C. The resulting NMP solution of calcium chloride was cooled to room temperature, after which 32 g of paraphenylenediamine was dissolved completely in the NMP solution. Subsequently, the reaction vessel was placed in a thermostatic chamber set at 20° C., and 58 g of dichloroterephthalate was added dropwise to the NMP solution over one hour. The NMP solution was then allowed to stand in the thermostatic chamber set at 20° C. for one hour to allow a polymerization reaction to proceed to synthesize polyparaphenylene terephthalamide (hereinafter simply referred to as "PPTA"). After the completion of the reaction, the NMP solution (polymerized solution) was transferred from the thermostatic chamber to a vacuum chamber having reduced pressure where the NMP solution was stirred for 30 minutes to degas it. The resulting polymerized solution was diluted with another NMP solution of calcium chloride to prepare an NMP solution of aramid having a PPTA concentration of 1.4 wt % (a precursor paste for porous heat resistant layer).

The obtained NMP solution of aramid was applied onto a stainless steel substrate by a bar coater, which was dried with hot air (80° C.) blown at a velocity of 0.5 m/sec to form a coating film of aramid. The coating film was then thoroughly washed with pure water to remove calcium chloride, and then dried again. Thereby, a 5 µm thick porous heat resistant layer sheet was formed. The obtained sheet of aramid was placed on the negative electrode material mixture layers, which was then rolled with rollers heated at 80° C. to bond the porous heat resistant layers to the negative electrode surfaces. The heat deflection temperature (deflection temperature under load) of the aramid was measured according to ASTM and found to be 321° C.

EXAMPLE 17

A prismatic battery was produced in the same manner as in EXAMPLE 1 except that a porous heat resistant layer comprising polyimide was formed on the negative electrode material mixture layers.

An NMP solution of polyamide acid (polyamide acid concentration: 3.9 wt %) was prepared by mixing 21 g of pyromellitic dianhydride and 20 g of diamine (diamino diphenyl ether) with 1 kg of NMP at room temperature.

The obtained NMP solution of polyamide acid (a precursor paste for porous heat resistant layer) was applied onto an stainless steel substrate by a bar coater, which was then dried with hot air (80° C.) blown at a velocity of 0.5 m/sec. The formed coating film was peeled off from the substrate, after which the peeled film was drawn to form a 5 µm thick sheet comprising the precursor for polyimide. The obtained sheet was heated at 300° C. to imidize the precursor by dehydration to produce polyimide. The obtained polyimide sheet was placed on the negative electrode material mixture layers, which were then rolled with rollers heated at 80° C. to bond the porous heat resistant layers to the negative electrode surfaces. The heat deflection temperature of the polyimide was 362° C.

EXAMPLE 18

A prismatic battery was produced in the same manner as in EXAMPLE 1 except that a porous heat resistant layer comprising polyamide imide was formed on the negative electrode material mixture layers.

The same NMP solution of polyamide acid (a precursor paste for porous heat resistant layer) as prepared in EXAMPLE 17 was applied onto a stainless steel substrate by a bar coater, which was then washed with water and dried with hot air (80° C.) blown at a velocity of 0.5 m/sec so as to cyclodehydrate the polyamide acid. The formed coating film was peeled off from the substrate to obtain a polyamide imide sheet having a thickness of 5 µm. The obtained polyamide imide sheet was placed on the negative electrode material mixture layers, which were then rolled with rollers heated at 80° C. to bond the porous heat resistant layers to the negative electrode surfaces. The heat deflection temperature of the polyamide imide was 280° C.

EXAMPLES 19 TO 21

Prismatic batteries were produced in the same manner as in EXAMPLE 11 except that, instead of alumina serving as the heat resistant filler, magnesia, zirconia or silica was used.

EXAMPLE 22

The same NMP solution of aramid as prepared in EXAMPLE 16 was applied, instead of onto a stainless steel substrate, onto one surface of the separator. The coating film of aramid attached to the separator was washed completely with water to remove calcium chloride, followed by drying to form a 5 µm thick porous heat resistant layer on the separator. A prismatic battery was produced in the same manner as in EXAMPLE 11 except that this separator was used.

EXAMPLE 23

The same polyimide sheet as prepared in EXAMPLE 17 was placed on one surface of the separator, which was then rolled with rollers heated at 80° C. so as to bond the polyimide sheet to the separator. A prismatic battery was produced in the same manner as in EXAMPLE 11 except that this separator was used.

EXAMPLE 24

The same polyamide imide sheet as prepared in EXAMPLE 18 was placed on one surface of the separator, which was then rolled with rollers heated at 80° C. so as to bond the polyamide imide sheet to the separator. A prismatic battery was produced in the same manner as in EXAMPLE 11 except that this separator was used.

COMPARATIVE EXAMPLE 1

A prismatic battery was produced in the same manner as in EXAMPLE 2 except that the second battery can was not used. Accordingly, this battery had no current shunts for positive and negative electrodes.

COMPARATIVE EXAMPLE 2

A prismatic battery was produced in the same manner as in EXAMPLE 4 except that the second battery can was not used. Accordingly, this battery had no current shunts for positive and negative electrodes.

COMPARATIVE EXAMPLE 3

A prismatic battery was produced in the same manner as in EXAMPLE 1 except that no porous heat resistant layer was formed on the negative electrode. In this battery, the exposed portion of the negative electrode current collector served as a current shunt for negative electrode, and the aluminum can served as a current shunt for positive electrode.

Table 1 shows the details of the batteries produced above.

TABLE 1

| | Location of porous heat resistant layer | Main component of porous heat resistant layer | Battery shape | Material of first battery can | Material of second battery can | Current shunt for positive electrode | Current shunt for negative electrode |
|---|---|---|---|---|---|---|---|
| Ex. 1 | Negative electrode | Alumina | Prism | Al | — | Al can | Exposed portion of negative electrode current collector |
| Ex. 2 | | | | | Iron | | Iron can |
| Ex. 3 | | | | Iron | — | Exposed portion of positive electrode current collector | |
| Ex. 4 | | | | | Al | Al can | |
| Ex. 5 | | | Cylinder | Al | — | | Exposed portion of negative electrode current collector |
| Ex. 6 | | | | | Iron | | Iron can |
| Ex. 7 | | | | Iron | — | Exposed portion of positive electrode current collector | |
| Ex. 8 | | | | | Al | Al can | |
| Ex. 9 | Positive electrode | | Prism | Al | — | | Exposed portion of negative electrode current collector |
| Ex. 10 | | | | | Iron | | Iron can |
| Ex. 11 | Separator | | | | — | | Exposed portion of negative electrode current collector |
| Ex. 12 | | | | | Iron | | Iron can |
| Ex. 13 | Negative electrode | Magnesia | Prism | Al | — | Al can | Exposed portion of negative electrode current collector |
| Ex. 14 | | Zirconia | | | | | |
| Ex. 15 | | Silica | | | | | |
| Ex. 16 | | Aramid | | | | | |
| Ex. 17 | | Polyimide | | | | | |
| Ex. 18 | | Polyamide imide | | | | | |
| Ex. 19 | Separator | Magnesia | | | | | |
| Ex. 20 | | Zirconia | | | | | |
| Ex. 21 | | Silica | | | | | |
| Ex. 22 | | Aramid | | | | | |
| Ex. 23 | | Polyimide | | | | | |
| Ex. 24 | | Polyamide imide | | | | | |
| Comp. Ex. 1 | Negative electrode | Alumina | | | | — | — |
| Comp. Ex. 2 | | | | Iron | | — | — |
| Comp. Ex. 3 | — | — | | Al | | Al can | Exposed portion of negative electrode current collector |

[Evaluation]

The batteries produced in EXAMPLEs 1 to 24 and COMPARATIVE EXAMPLEs 1 to 3, fifty batteries of each, were subjected to the following evaluation tests.

(Internal Short-Circuit Test)

Each battery was pre-cycled (pre-charged and discharged) twice and then charged at a current value of 400 mA until the battery voltage reached 4.1 V. The charged battery was then stored in an environment of 45° C. for 7 days. The batteries whose open circuit voltage dropped by 300 mV or more after storage were deemed to be batteries having an internal short-circuit.

Subsequently, the batteries having an internal short-circuit were discharged at a current value of 400 mA at room temperature until the battery voltage reached 3.0 V, and then subjected to constant current charge at 2 A for one hour. Table 2 shows the battery surface temperature immediately after charging.

(Nail Penetration Test)

Among the batteries of EXAMPLEs 1 to 24 and COMPARATIVE EXAMPLEs 1 to 3, those having deemed to be batteries having no internal short-circuit were charged under the following conditions.

<Charge Condition>

Constant current charge: current value 1400 mA/end-of-charge voltage 4.3 V

Constant voltage charge: voltage value 4.3 V/end-of-charge current 100 mA

In an environment of 20° C., each of the charged battery was pierced from its side to a depth of 2 mm with an iron nail having a diameter of 2.7 mm at a rate of 5 mm/sec, during which the surface temperature of the battery was measured by a thermocouple attached on the side face of the battery apart from the pierced portion. Table 2 shows the battery surface temperature 30 seconds after the nail penetration.

TABLE 2

| | Battery surface temperature [° C.] | |
|---|---|---|
| | Internal short circuit test | Nail penetration test |
| Ex. 1 | 45 | 82 |
| Ex. 2 | 46 | 68 |
| Ex. 3 | 40 | 82 |
| Ex. 4 | 43 | 67 |
| Ex. 5 | 35 | 83 |
| Ex. 6 | 37 | 60 |
| Ex. 7 | 41 | 80 |
| Ex. 8 | 45 | 65 |
| Ex. 9 | 35 | 86 |
| Ex. 10 | 44 | 64 |
| Ex. 11 | 38 | 88 |
| Ex. 12 | 43 | 64 |
| Ex. 13 | 42 | 82 |
| Ex. 14 | 32 | 87 |
| Ex. 15 | 40 | 83 |
| Ex. 16 | 37 | 90 |
| Ex. 17 | 31 | 85 |

TABLE 2-continued

|  | Battery surface temperature [° C.] | |
| --- | --- | --- |
|  | Internal short circuit test | Nail penetration test |
| Ex. 18 | 34 | 83 |
| Ex. 19 | 38 | 85 |
| Ex. 20 | 30 | 86 |
| Ex. 21 | 38 | 79 |
| Ex. 22 | 40 | 81 |
| Ex. 23 | 42 | 84 |
| Ex. 24 | 35 | 82 |
| Comp. Ex. 1 | 43 | 121 |
| Comp. Ex. 2 | 48 | 102 |
| Comp. Ex. 3 | 116 | 85 |

[Analysis]

In the nail penetration test, the battery of EXAMPLE 1 exhibited a much lower battery surface temperature than the batteries of COMPARATIVE EXAMPLEs 1 and 2 having no current shunt. In the internal short-circuit test, the battery surface temperature of the battery of EXAMPLE 1 was much lower than that of the battery of COMPARATIVE EXAMPLE 3 having no porous heat resistant layer. These results show that the battery of the present invention ensures high level of safety in the event of an internal short-circuit as well as during nail penetration test.

The surface temperature of the battery of EXAMPLE 2 obtained in the nail penetration test was lower than that of the battery of EXAMPLE 1. This is presumably because the use of the battery case having a double structure contributed to the dissipation of heat to the outside.

Moreover, comparisons between the batteries of EXAMPLEs 3 and 4 and the batteries of COMPARATIVE EXAMPLEs 1 to 3 also show that the batteries of the present invention ensure high level of safety in the event of an internal short-circuit as well as during nail penetration test. The results of EXAMPLEs 5 to 8 show that the effect of the present invention is not significantly affected by the battery shape. The results of EXAMPLEs 9 to 12 show that the effect of the present invention is not significantly affected by the location of the porous heat resistant layer. The results of EXAMPLEs 13 to 24 show that the effect of the present invention is not significantly affected by the composition of the porous heat resistant layer.

In the battery of COMPARATIVE EXAMPLE 1, the aluminum can deformed greatly by penetration of the nail. Further, the battery of COMPARATIVE EXAMPLE 1 exhibited an extremely high surface temperature as compared to the battery of COMPARATIVE EXAMPLE 2 in the nail penetration test. The battery of COMPARATIVE EXAMPLE 3 having no porous heat resistant layer also exhibited an extremely high surface temperature in the internal short-circuit test.

The present invention is useful particularly for lithium secondary batteries which are required to have high level of safety in the event of an internal short-circuit as well as in a nail penetration test. The lithium secondary battery of the present invention is applicable to power sources for portable devices such as personal digital assistants and mobile electronic devices. The application of the lithium secondary battery of the present invention, however, is not specifically limited, and it is also applicable to compact electrical energy storage system for home use and power sources for two-wheeled vehicles, electric vehicles and hybrid electric vehicles.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A lithium secondary battery comprising an electrode group, a non-aqueous electrolyte and a battery can for housing said electrode group and said non-aqueous electrolyte,
   said electrode group comprising: a positive electrode comprising a strip-shaped positive electrode current collector and positive electrode material mixture layers carried on both sides of said positive electrode current collector; a negative electrode comprising a strip-shaped negative electrode current collector and negative electrode material mixture layers carried on both sides of said negative electrode current collector; a separator; and a porous heat resistant layer,
   said positive electrode and said negative electrode being spirally wound with said separator and said porous heat resistant layer interposed therebetween, wherein:
   said positive electrode current collector or said negative electrode current collector is exposed over an entire outermost surface of said electrode group,
   the exposed current collector faces an inner surface of said battery can with said separator but without said porous heat resistant layer interposed therebetween, and has opposite polarity to that of said battery can, and
   said porous heat resistant layer contacts an entire surface of the positive electrode material mixture layer or an entire surface of the negative electrode material mixture layer.

2. The lithium ion secondary battery in accordance with claim 1, wherein:
   said battery can comprises aluminum and is electrically connected to said positive electrode, and the exposed current collector is said negative electrode current collector.

3. The lithium ion secondary battery in accordance with claim 1, wherein:
   said separator is a microporous film made of a polyolefin, and
   said porous heat resistant layer comprises a highly heat resistant resin, said highly heat resistant resin being aramid, polyamideimide or polyimide.

4. The lithium ion secondary battery in accordance with claim 1, wherein:
   said separator is a microporous film made of a polyolefin, and
   said porous heat resistant layer comprises a composite of a heat resistant filler and a resin binder, the amount of said heat resistant filler being 90 to 99 wt% of said porous heat resistant layer.

5. A lithium secondary battery comprising an electrode group, a non-aqueous electrolyte and a battery can for housing said electrode group and said non-aqueous electrolyte,
   said electrode group comprising: a positive electrode comprising a strip-shaped positive electrode current collector and positive electrode material mixture layers carried on both sides of said positive electrode current collector; a negative electrode comprising a strip-shaped negative electrode current collector and negative electrode material mixture layers carried on both sides of said negative electrode current collector; a separator; and a porous heat resistant layer, said positive electrode and said negative electrode being spirally wound with said separator and said porous heat resistant layer interposed therebetween, wherein said positive electrode current collector or said negative electrode current collector is exposed over an entire outermost surface of said electrode group, the exposed current collector faces an inner surface of said battery can with said separator but without said porous heat resistant layer interposed therebetween, and has opposite polarity to that of said battery can, and when the exposed current collector is said negative electrode current collector, a portion of said negative electrode is disposed between the exposed negative electrode current collector and an outermost portion of said positive electrode, or when the exposed current collector is said positive electrode current collector, a portion of said positive electrode is disposed between the exposed positive electrode current collector and an outermost portion of said negative electrode, and said porous heat resistant layer contacts an entire surface of the positive electrode material mixture layer or an entire surface of the negative electrode material mixture layer.

6. The lithium ion secondary battery in accordance with claim 5, wherein said battery can comprises aluminum and is electrically connected to said positive electrode, the exposed current collector is said negative electrode current collector, and a portion of said negative electrode is disposed between the exposed negative electrode current collector and an outermost portion of said positive electrode.

* * * * *